United States Patent Office 3,007,105
Patented Oct. 31, 1961

3,007,105
ELECTRICAL CONTROL APPARATUS
Richard E. Klokow and Robert L. Gasperetti, Lima, Ohio, assignors to Westinghouse Electric Corporation, East Pittsburgh, Pa., a corporation of Pennsylvania
Filed Apr. 13, 1959, Ser. No. 805,862
11 Claims. (Cl. 322—36)

This invention relates to excitation systems for dynamoelectric machines, such as synchronous generators, and more particularly to electrical control apparatus, such as regulator systems, for controlling said excitation systems.

In certain types of conventional excitation systems for dynamoelectric machines, such as polyphase synchronous generators, a problem arises in providing protection for said machines during certain abnormal operating conditions. For example, if the shaft of a synchronous generator is mechanically coupled to an associated prime mover and certain abnormal operating conditions, such as a three-phase fault or short-circuit condition, occur at the output terminals of said generator, the regulator system associated with said generator may attempt to maintain the output voltage of said generator at a predetermined value and cause excessive excitation current to be supplied to the excitation field winding of said generator. Since the torque applied to the shaft of a synchronous generator by the associated prime mover varies with the excitation current supplied to the field winding of said generator during such abnormal operating conditions, the torque applied to the shaft of said generator by the associated prime mover may be sufficient to damage or shear the mechanical coupling between the prime mover and the shaft of the synchronous generator. It is, therefore, desirable to provide an excitation system of the type described in which sufficient excitation is supplied to the associated dynamoelectric machine during normal operating conditions and in which excessive excitation is prevented or limited under certain operating conditions.

It is an object of this invention to provide a new and improved excitation system for a dynamoelectric machine, such as a synchronous generator.

Another object of this invention is to provide a new and improved electrical control apparatus, such as a regulator system, for controlling the excitation current supplied to a dynamoelectric machine.

A further object of this invention is to provide a regulator system for controlling the excitation current supplied to an associated dynamoelectric machine, such as a synchronous generator, in which the excitation supplied to said machine during certain abnormal operating conditions is limited.

A more specific object of this invention is to provide a regulator system for controlling the excitation supplied to an associated dynamoelectric machine, such as a synchronous generator, and for limiting the maximum excitation and the corresponding torque applied to the shaft of said machine during certain abnormal operating conditions.

Other objects of the invention will in part be obvious, and will, in part, appear hereinafter.

For a fuller understanding of the nature and objects of the invention reference should be had to the following detailed description taken in connection with the accompanying drawing, in which.

Figure 1:
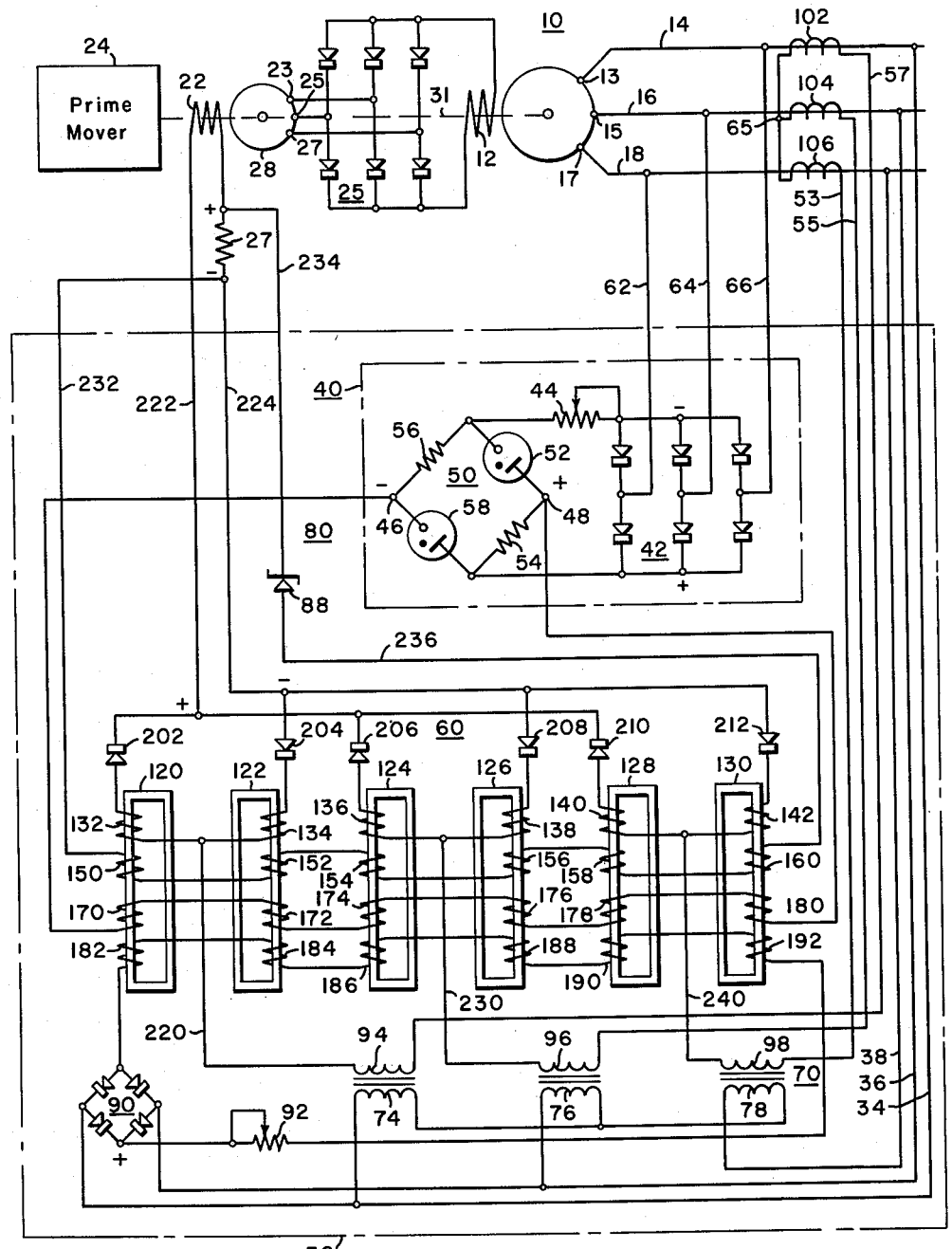
FIGURE 1 is a schematic diagram of a regulator system illustrating the teachings of the invention.

Referring now to the drawing and FIG. 1 in particular, there is illustrated a dynamoelectric machine, more specifically a synchronous generator 10 of the so-called brushless type having an excitation field winding 12 and output terminals 13, 15 and 17. In this instance, the generator 10 is disposed to supply electric power through the output terminals 13, 15 and 17 to a load (not shown) connected at the line conductors 14, 16 and 18, respectively, which are part of a three-phase electrical system. In order to obtain an excitation voltage across the field winding 12 of a relatively large magnitude, an exciter 20 of the alternating current type is provided. The exciter 20 comprises an armature 28 having alternating current output terminals 23, 25 and 27, which supply excitation current to the field winding 12 of the generator 10 through a three-phase, full-wave rectifier 25, and a separate excitation field winding 22. The armature or rotor member 28 of the exciter 20 is preferably mounted or disposed on the same shaft as the generator rotor, as indicated at 31. The generator 10 and the exciter 20 are both driven by a suitable prime mover 24 which drives or applies a torque to the shaft 31. The latter torque varies with the excitation current being supplied to the excitation field winding 12 of the generator 10 during certain abnormal operating conditions, as will be explained in detail hereinafter.

The excitation current supplied to the excitation field winding 22 of the exciter 20 is provided by a first transformer means 70 which is responsive to the output voltage of the generator 10 and a second transformer means, comprising the current transformers 102, 104 and 106, which is responsive to the output current of the generator 10. In order to maintain the output voltage of the synchronous generator 10 at substantially a predetermined regulated value, a regulator system 30 is connected between said transformer means and the excitation field winding 22 of the exciter 20. In order to prevent said transformer means as controlled by said regulator system from supplying excessive excitation to the generator 10 during short-circuit or fault conditions and during other operating conditions, a limiting means or circuit 80 is connected in circuit relation with said transformer means and the regulator system 30.

In general, the regulator system 30 comprises an error detecting circuit 40 for producing a direct current error signal or voltage which is a measure of the deviation of the output terminal voltage of the synchronous generator 10 from a reference voltage or from its regulated value and control means, more specifically a magnetic amplifier 60, for producing an output excitation current which varies with the error signal from the error detecting circuit 40 and which is applied to the excitation field winding 22 of the exciter 20. The regulator system 30 operates during normal operating conditions to provide excitation current to the field winding 12 of the generator 10 from the first and second transformer means which is varied in accordance with the output voltage of the generator 10 in order to maintain said output voltage at a predetermined regulated value. During certain abnormal operating conditions, the limiting means or circuit 80 limits the excitation current applied to the field winding 12 by the regulator system 30 and the corresponding torque applied to the shaft 31 of the generator 10 by the prime mover 24.

In this instance, the error detecting circuit 40 comprises a well-known bridge circuit 50, a rheostat 44, and a three-phase, full-wave rectifier 42. The input of the full-wave rectifier 42 is connected through the conductors 62, 64 and 66 to be responsive to the output terminal voltage of the generator 10 at the line conductors 14, 16 and 18. It is to be understood that a potential transformer may be interposed between the input of the rectifier 42 and the conductors 14, 16 and 18, where required in a particular application. The output of the full-wave rectifier 42 is connected across the input terminals of the bridge circuit 50 through the rheostat 44. The bridge circuit 50 includes two parallel branches, a first branch comprising the resistor 56 connected in series circuit relationship with the voltage regulating tube 58 and a second branch comprising the voltage regulating tube 52 and the resistor 54 connected in series circuit relationship. The voltage regulating tubes 52 and 58 may be of the gas discharge type, but it is to be understood that semiconductor diodes, preferably of the type known to the art as Zener diodes, may be substituted for said tubes. The output voltage or signal of the error detecting circuit 40 appears at the output terminals 46 and 48 of the bridge circuit 50.

In the operation of the error detecting circuit 40, the direct current output voltage of the full-wave rectifier 42 is a measure of the output terminal voltage of the generator 10. The rheostat 44 is provided in order to vary the portion of the output voltage of the full-wave rectifier 42 that is applied to the input terminals of the bridge circuit 50. During operation, the direct current voltage across the voltage regulating tubes 52 and 58 remains substantially constant since the voltage applied to the tubes 52 and 58 is always of a greater magnitude than the breakdown voltage of each of said tubes. It will be seen that when a direct current voltage is applied at the input terminals of the bridge circuit 50 which is substantially equal to twice the voltage drop across each of the tubes 52 and 58, there will be no voltage difference existing across the output terminals 46 and 48 of the error detecting circuit 40. When, however, the voltage across the input terminals of the bridge circuit 50 is either above or below the reference voltage of the bridge circuit 50, which is twice the voltage drop across each of the tubes 52 and 58, then a voltage difference will exist across the output terminals 46 and 48 of the error detecting circuit 40. The polarity of the output voltage or signal of the error detecting circuit 40 at the terminals 46 and 48 will depend upon whether the input voltage is above or below the reference voltage of the bridge circuit 50. In the normal range of operation of the regulator system 30, as illustrated, the polarity of the output voltage or signal from the error detecting circuit 40 applied to the magnetic amplifier 60 may reverse in a particular application. The rheostat 44 is adjusted initially to obtain the desired magnitude and polarity of the output error voltage from the error detecting circuit 40. The setting of the rheostat 44 is also changed to adjust the regulated value of voltage at which the regulator system 30 maintains the output terminal voltage of the generator 10 during normal operating conditions.

As hereinbefore mentioned, the three-phase magnetic amplifier 60 is responsive during normal operating conditions to the output signal of the error detecting circuit 40 in controlling the excitation current supplied to the excitation field winding 22 of the exciter 20 from the first transformer means 70 and the second transformer means, comprising the current transformers 102, 104 and 106. As illustrated, the magnetic amplifier 60 comprises the magnetic core members 120, 122, 124, 126, 128 and 130 which have disposed in inductive relationship therewith the load windings 132, 134, 136, 138, 140, and 142, respectively. In this instance, the load windings 132, 134, 136, 138, 140 and 142 have connected in series circuit relationship therewith, the self-saturating rectifiers 202, 204, 206, 208, 210 and 212, respectively, in order to ensure that current flows in only one direction through the respective load windings. As illustrated, the load windings 132, 136 and 140 are so connected to a conductor 222 and the load windings 134, 138 and 142 are so connected to a conductor 224 that the output current of the magnetic amplifier 60 flows in only one direction through the field winding 22 of the exciter 20. For reasons which will be discussed hereinafter, a resistor 27, which is part of the limiting circuit 80, is connected between the conductor 224 and the right end of the field winding 22 of the exciter 20.

In order to apply a three-phase voltage to the load windings 132, 134, 138, 140 and 142 of the magnetic amplifier 60, the three-phase potential transformer 70, which is responsive to the output voltage of the generator 10, and the current transformers 102, 104 and 106, which are responsive to the output current of said generator, are so interconnected as to produce a combined three-phase output voltage at the conductors 220, 230, and 240. In particular, the primary phase windings 74, 76 and 78 of the transformer 70 are Y-connected to the line conductors 14, 16 and 18, respectively. The current transformers 102, 104 and 106 are disposed adjacent to and in inductive relationship with the line conductors 14, 16 and 18, respectively, and the output voltage from said current transformers varies with, or is responsive to, the output current from the generator 10 which flows in the respective line conductors. The transformer 70 also includes three secondary phase windings 94, 96 and 98, one end of each of said secondary phase windings being connected to the neutral terminal 65 through one of the associated current transformers 102, 104 and 106, respectively. The other ends of the secondary phase windings 94, 96 and 98 are connected to the output conductors 220, 230 and 240, respectively. The three-phase output voltage at the conductors 220, 230 and 240 is applied to the load windings of the magnetic amplifier 60 by connecting said conductors to the lower junction points of the load windings 132 and 134, 136 and 138, and 140 and 142, respectively, as shown in the drawing.

In order to bias the magnetic amplifier 60 by a predetermined amount, the magnetic core members 120, 122, 124, 126, 128 and 130 have disposed in inductive relationship therewith, the biasing windings 182, 184, 186, 188, 190 and 192, respectively. As illustrated, the biasing windings 182, 184, 186, 188, 190 and 192 are connected in series circuit relation with one another through a rheostat 92 across the output terminals of a full-wave dry-type rectifier 90 whose input terminals are electrically connected to the line conductors 14 and 16 through the conductors 34 and 36, respectively, for receiving energy therefrom. The biasing windings 182, 184, 186, 188, 190 and 192 are so disposed on their respective magnetic core members that current flow therethrough produces flux which opposes the flux produced by the current flow through the associated load windings 132, 134, 136, 138, 140 and 142, respectively.

For the purpose of saturating the magnetic core members 120, 122, 124, 126, 128 and 130 in accordance with the output signal from the error detecting circuit 40, the control windings 170, 172, 174, 176, 178 and 180 are disposed in inductive relationship with the core members 120, 122, 124, 126, 128 and 130, respectively. As illustrated, the control windings 170, 172, 174, 176, 178 and 180 are so disposed on their respective magnetic core members that current flow therethrough produces flux which opposes or aids the flux produced by the current flow through the associated biasing windings 182, 184, 186, 188, 190 and 192, respectively, depending on the magnitude of said output signal and the bias provided by said bias windings. In this instance, the control windings 170, 172, 174, 176, 178 and 180 are connected in series circuit relationship, the series circuit being connected across the output terminals 46 and 48 of the error detecting circuit 40.

For a purpose which will be discussed hereinafter, the magnetic core members 120, 122, 124, 126, 128 and 130 have disposed in inductive relationship therewith the limiting windings 150, 152, 154, 156, 158 and 160, respectively. As illustrated, the limiting windings 150, 152, 154, 156, 158 and 160 are connected in series circuit relationship with one another, the series circuit being connected to the limiting means or circuit 80 at the conductors 232 and 236. The limiting windings 150, 152, 154, 156, 158 and 160 are so disposed on their respective core members that current flow therethrough produces flux which opposes the flux produced by the current flow through the associated load windings 132, 134, 136, 138, 140 and 142, respectively.

The manner in which the load windings 132, 134, 136, 138, 140 and 142 of the magnitude amplifier 60 receive energy from the potential transformer 70 which includes the secondary phase windings 94, 96 and 98 and from the current transformers 102, 104 and 106 can be better understood by tracing the current flow through these load windings during various phases of the output voltage of the transformer 70. Assuming that the right end of the secondary phase winding 94 of the transformer 70 is at a positive polarity with respect to the left end of the winding 94, then current flows from the right end of the winding 94, through the conductor 57, the current transformer 102, the current transformer 104, the conductor 55, the secondary phase winding 96, through the conductor 230, through the load winding 136 and a self-saturating rectifier 206 to the conductor 222, through the field winding 22 of the exciter 20, the resistor 27, the conductor 224, the self-saturating rectifier 204, the load winding 134, and back to the left end of the secondary phase winding 94, through the conductor 220. When the right end of the secondary phase winding 94 is at a positive polarity with respect to the left end of the winding 94, current also flows from the right end of the winding 94, through the conductor 57, the current transformer 102, the current transformer 106, the conductor 53, the secondary phase winding 98, the conductor 240, the load winding 140, the self-saturating rectifier 210, the conductor 222, the field winding 22 of the exciter 20, the resistor 27, the conductor 224, the self-saturating rectifier 204, the load winding 134 and back to the left end of the phase winding 94 through the conductor 220.

During the next phase of the output voltage of the transformer 70, in which the right end of the secondary phase winding 96 is at a positive polarity with respect to the left end of the winding 96, current flows from the right end of the winding 96 through the conductor 55, the current transformer 104, the current transformer 102, the conductor 57, the secondary phase winding 94, the conductor 220, the load winding 132, the self-saturating rectifier 202, the conductor 222, the field winding 22 of the exciter 20, the resistor 27, the conductor 224, the self-saturating rectifier 208, the load winding 138 and back to the left end of the phase winding 96 through the conductor 230. When the right end of the secondary phase winding 96 is at a positive polarity with respect to the left end of said winding, current flows from the right end of said winding through the conductor 55, the current transformer 104, the current transformer 106, the conductor 53, the secondary phase winding 98, the conductor 240, the load winding 140, the self-saturating rectifier 210, the conductor 222, the field winding 22 of the exciter 20, the resistor 27, the conductor 224, the self-saturating rectifier 208, the load winding 138 and back to the left end of the secondary phase winding 96 through the conductor 230.

During the next phase of the output voltage of the transformer 70, in which the right end of the secondary phase winding 98 is at a positive polarity with respect to the left end of the winding 98, current flows from the left end of said winding through the conductor 53, the current transformer 106, the current transformer 104, the conductor 55, the secondary phase winding 96, the conductor 230, the load winding 136, the self-saturating rectifier 206, the conductor 222, the field winding 22 of the exciter 20, the resistor 27, the conductor 224, the self-saturating rectifier 212, the load winding 142, and back to the left end of the phase winding 98 through the conductor 240. When the right end of the secondary phase winding 98 is at a positive polarity with respect to the left end of said winding, current also flows from the right end of said winding through the conductor 53, the current transformer 106, the current transformer 102, the conductor 57, the secondary phase winding 94, the conductor 220, the load winding 132, the self-saturating rectifier 202, the conductor 222, the field winding 22 of the exciter 20, the resistor 27, the conductor 224, the self-saturating rectifier 212, the load winding 142 and back to the left end of the phase winding 98 through the conductor 240.

The operation of the regulator system 30 during normal operating conditions, in the absence of the limiting means or circuit 80, will now be described. The rheostat 44 of the error detecting circuit 40 is adjusted initially so that an output error signal or voltage appears at the output terminals 46 and 48 of the error detecting circuit 40 which is positive at the terminal 48 with respect to the voltage at the terminal 46. The error voltage or signal is also adjusted so as to be of the proper magnitude to cause an excitation current to appear at the output of the magnetic amplifier 60 which will cause an average value of excitation current to be applied to the excitation field winding 22 of the exciter 20 and in turn to the excitation field winding 12 of the generator 10 which will result in a desired value of regulated voltage at the output terminals 13, 15 and 17 of the generator 10. After the rheostat 44 has been adjusted for the desired regulated value of voltage at the output terminals of the generator 10, any change in the output terminal voltage of the generator 10 will result in a corresponding change in the output error signal or voltage of the error detecting circuit 40 which appears at the terminals 46 and 48. For example, if the output terminal voltage of the generator 10 should start to drop below the regulated value, the output error voltage of the error detecting circuit 40 at the terminals 46 and 48 will vary as the output terminal voltage of the generator 10 decreases. The effect of a changing voltage at the output terminals 46 and 48 of the error detecting circuit 40 is to change the magnitude or direction of the current flow through the control windings 170, 172, 174, 176, 178 and 180 of the magnetic amplifier 60. The change in magnitude or direction of the current flow through the control windings 170, 172, 174, 176, 178 and 180 changes the magnitude or direction, respectively, of the fluxes produced thereby in the core members 120, 122, 124, 126, 128 and 130 of the magnetic amplifier 60 respectively, which fluxes aid or oppose the fluxes produced in the respective core members by the current flow through the load windings 132, 134, 136, 138, 140 and 142, respectively, thereby increasing the output current of the magnetic amplifier 60. With an increase in the output current of the magnetic amplifier 60, the magnitude of the current flow through the field winding 22 of the exciter 20 also increases to thereby increase the voltage across the field winding 12 of the generator 10 and return the output voltage of the generator 10 to substantially its predetermined regulated value.

On the other hand, if the output terminal voltage of the generator 10 increases to a value above the desired regulated value, then the output voltage of the error detecting circuit 40 changes correspondingly, and the magnitude of the current flow through the control windings 170, 172, 174, 176, 178 and 180 of the magnetic amplifier 60 also changes or the direction of said current reverses. A change in the magnitude of the current flow through the control windings 170, 172, 174, 176, 178 and 180 or a change in the direction of said current flow changes the magnitude or direction respectively of fluxes produced thereby in the core members 120, 122, 124, 126, 128 and 130, respectively, which fluxes aid or oppose the fluxes produced in the respective core members by the current flow through the load windings 132, 134, 136, 138, 140 and 142, respectively, to thereby decrease the output current of the magnetic amplifier 60. A decrease in the output current of the magnetic amplifier 60 decreases the magnitude of the current flow through the field winding 22 of the exciter 20 and the excitation current applied to the field winding 12 of the generator 10 to thereby decrease the output voltage of the generator 10 and return said output voltage to its predetermined regulated value.

The manner in which the potential transformer 70 and the current transformers 102, 104 and 106 are interconnected with the magnetic amplifier 60 has several important results. First, since the potential transformer 70 is responsive to the output voltage of the generator 10 and the current transformers 102, 104 and 106 are directly responsive to the output load current of the generator 10 and said transformers are interconnected so as to produce a combined output voltage which is applied to the load windings of the magnetic amplifier 60, the output current of the magnetic amplifier 60 as applied to the field winding 22 of the exciter 20 may be increased without a corresponding change in the output signal or voltage of the error detecting circuit 40. The transient performance of the regulating system 30 is, therefore, improved, and less gain is required in the magnetic amplifier 60 with a resulting improvement in the stability of the regulator system 30. A second important result of the arrangement described is that even if the line conductors 14, 16 and 18 or the load circuit connected thereto should become shorted or an abnormal operating condition, such as a fault, should occur, thereby reducing the output voltage of the transformer 70 to a negligible value, the current transformers 102, 104 and 106 continue to supply voltage to the load windings 132, 134, 136, 138, 140 and 142 of the magnetic amplifier 60 thereby providing field excitation for the generator 10 even when the line conductors 14, 16 and 18 are subject to certain abnormal operating conditions. In other words, sufficient excitation is assured for the generator 10 during short-circuit or fault conditions so that the output current of the generator 10 is sufficient to actuate associated protective equipment. In the absence of the limiting means or circuit 80, however, the excitation supplied to the field winding 12 of the generator 10 from the current transformers 102, 104 and 106 by the magnetic amplifier 60 during short-circuit or fault conditions will be excessive if the regulator system 30 is permitted to attempt to maintain the output voltage of said generator at substantially a predetermined value, and the corresponding torque applied to the shaft of the generator 10 by the prime mover 24 becomes sufficient to damage or shear the mechanical coupling between said prime mover and said generator.

The limiting means or circuit 80 is provided in order to prevent excessive excitation from being supplied to the generator 10 during certain abnormal operating conditions, such as when a short-circuit or fault occurs at the line conductors 14, 16 and 18, and when the regulator system 30 might otherwise attempt to maintain the output voltage of said generator at substantially a predetermined value. By limiting the excitation supplied to the generator 10 during such operating conditions, the limiting means or circuit 80 also operates to limit the torque applied to the shaft of the generator 10 by the prime mover 24 and to prevent possible damage to the mechanical coupling between said prime mover and the shaft 31 of said generator.

In particular, the limiting means or circuit 80 includes a resistor 27 which is connected in series circuit relationship with the field winding 22 of the exciter 20, the voltage across said resistor varying with the excitation current supplied to the excitation field winding 22 by the magnetic amplifier 60. In order to provide a predetermined limiting action during short-circuit or fault conditions, the limiting means or circuit 80 also includes a semiconductor diode 88, preferably of the type known to the art as a Zener diode. The semiconductor diode 88 is connected in series circuit relationship with the limiting windings 150, 152, 154, 156, 158 and 160 of the magnetic amplifier 60, the series circuit being connected across the resistor 27 by the conductors 232, 234 and 236 with the diode 88 poled in the reversed direction. The diode 88 is of a general type which has a predetermined, non-destructive, reverse breakdown characteristic when the voltage applied to said diode in the reverse direction exceeds a predetermined value. In other words, as long as the voltage across the resistor 27, which varies with the excitation current flowing through said resistor remains below a critical breakdown voltage associated with the diode 88, the current through said diode and the limiting windings 150 through 160 of the magnetic amplifier 60 remains at a negligible value. When, however, the excitation current flowing through the resistor 27 and the corresponding voltage across the resistor 27 exceeds a predetermined value, the voltage across the diode 88 will exceed a critical breakdown value in its reverse volt-ampere characteristic and current will begin to flow through the limiting windings 150 through 160 of the magnetic amplifier 60.

The operation of the limiting means or circuit 80 and the effect of said operation on the operation of the regulator system 30 will now be considered. During the normal operation of the generator 10 and the regulator system 30 in the absence of short-circuit or fault conditions at the line conductors 14, 16 and 18, the limiting means or circuit 80 has no effect on the operation of the regulator system 30. This is because the diode 88 is poled in the reverse direction and does not permit current flow in the limiting windings 150 through 160 of the magnetic amplifier 60 so long as the voltage across the resistor 27 is below the critical breakdown voltage associated with the diode 88. When, however, short-circuit or fault conditions occur at the line conductors 14, 16 and 18 and the regulator system 30 attempts to maintain the output voltage of the generator 10 at substantially a predetermined value, the excitation current flowing through the resistor 27 from the magnetic amplifier 60 will increase and the corresponding voltage across the resistor 27 will also increase until the latter voltage exceeds the critical breakdown voltage associated with the diode 88. During such abnormal operating conditions when the voltage across the resistor 27 increases to a value in excess of the breakdown voltage of the diode 88, current will flow from the upper end of the resistor 27 through the diode 88 and through the limiting windings 150, 152, 154, 156, 158 and 160 of the magnetic amplifier 60. The flux produced by the latter current flow through the limiting windings 150, 152, 154, 156, 158 and 160 in the core members 120, 122, 124, 126, 128 and 130, respectively, will oppose the flux produced by the current flow in the associated load windings 132, 134, 136, 138, 140 and 142, respectively, and prevent any further increase in the output current of the magnetic amplifier 60, and in turn prevent any further increase in the excitation current applied to the field winding 12 of the generator 10 during short-circuit or fault conditions. In other words, the effect of the limiting means 80 is to limit the excitation current supplied by the regular system 30 to the field winding 12 of the generator 10 to substantially a predetermined value after the excitation current reaches said predetermined value.

Figure 3:
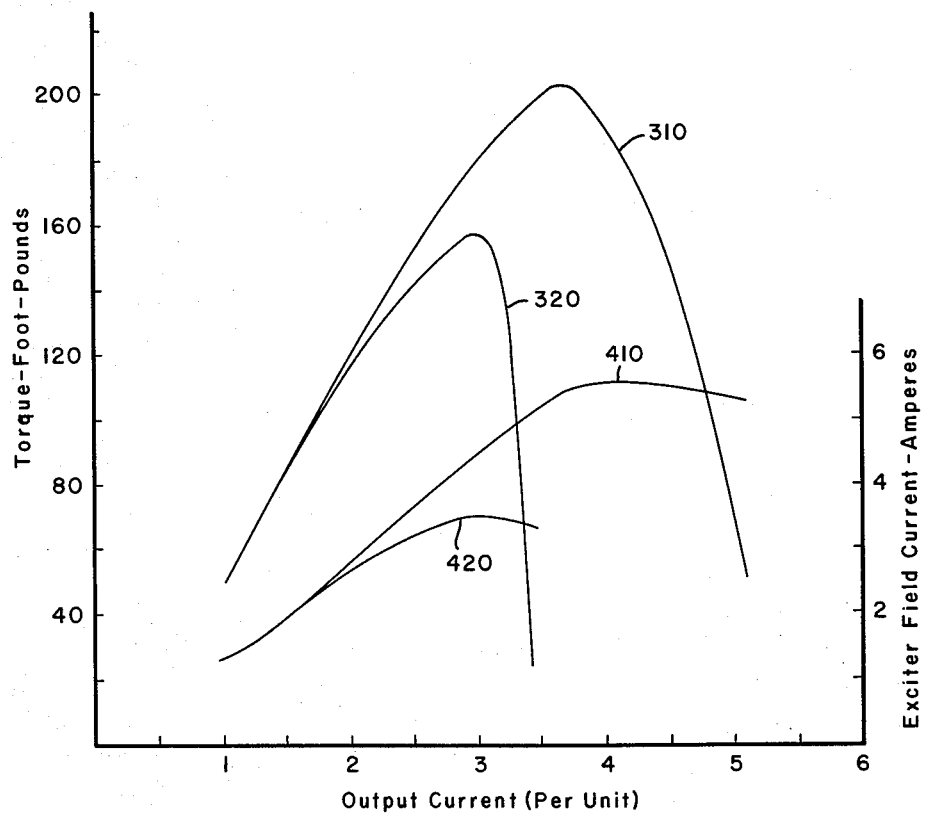
FIG. 3 is a set of curves illustrating the operation of the regulator system shown in FIG. 1.

Referring to FIG. 3, the effect of the operation for the limiting means or circuit 80 on the operation of the regulator system 30 can better be understood by referring to the curves 410 and 420 shown in FIG. 3. The curve 410 represents the excitation current supplied to the field winding 12 of the generator 10 by the regulator system 30 as a function of the output current of the generator 10 during certain abnormal operating conditions in the absence of the limiting means or circuit 80. It is to be noted that, in the absence of the limiting means 80, the regulator system 30 supplies a rather excessive value of excitation current to the field winding 12 of the generator 10 as the output current of said generator increases during certain abnormal operating conditions. The curve 420 represents the excitation current supplied to the field winding 12 of the generator 10 as a function of the output current of said generator during the same abnormal operating conditions, as limited by the action of the limiting means 80. Comparing the curves 410 and 420, it is seen that the effect of the operation of the limiting means 80 on the operation of the regulator system 30 is to limit the excitation current supplied to the field winding 12 of the generator 10 to a much lower value during certain abnormal operating conditions. Since the torque applied to the shaft 31 of the generator 10 also varies as a function of or with the excitation current supplied to the field winding 12 of the generator 10 during certain abnormal operating conditions, the effect of the operation of the limiting means 80 is also to limit the torque applied to the shaft of the generator 10 by the prime mover 24 to a predetermined safe value. The curve 310 represents the torque applied to the shaft 31 of the generator 10 by the prime mover 24 as a function of the output current of said generator during certain abnormal operating conditions in the absence of the limiting means or circuit 80. On the other hand, the curve 320 represents the torque applied to the shaft of the generator 10 by the prime mover 24 as a function of the output current of said generator during the same abnormal operating conditions as limited by the limiting means 80. Comparing the curves 310 and 320, it is seen that the effect of the limiting means or circuit 80 is to limit the torque applied to the shaft of the generator 10 by the prime mover 24 during certain abnormal operating conditions to a much lower predetermined value so as to prevent damage or shearing of the mechanical coupling between the prime mover 24 and the shaft 31 of the generator 10.

Figure 2:
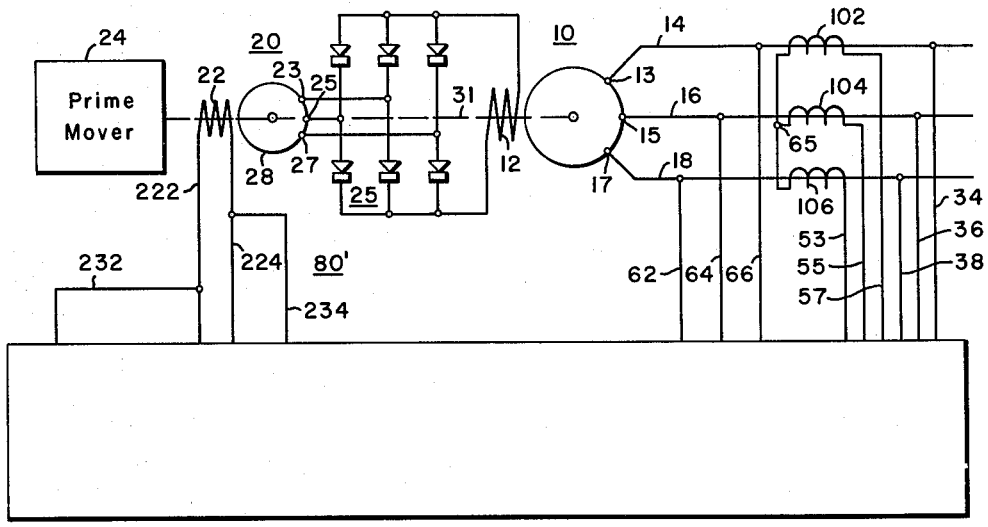
FIG. 2 is a partial schematic diagram illustrating a second embodiment of the invention.

Referring now to FIG. 2, there is illustrated an alternate embodiment of the invention. In general, the embodiment of the invention shown in FIG. 2 is similar to that shown in FIG. 1, except that an alternate regulator system 30' including an alternate limiting means 80' is substituted for the regulator system 30 shown in FIG. 1. The limiting means 80' differs from the limiting means 80 only with respect to the type of limiting signal which is employed. The limiting signal in the limiting means 80' varies with the voltage across the excitation field winding 22 of the exciter 20 rather than with the excitation current through said field winding, as in the limiting means or circuit 80. In other words, the resistor 27 is omitted and the conductor 232 is connected to one side of the field winding 22 and the conductor 234 is connected to the other side of the field winding 22. The balance of the regulator system 30' is the same as the regulator system 30 previously described.

The over-all operation of the regulator system 30' is similar to that of the regulator system 30, except that the limiting action of the limiting means 80' is initiated when the voltage across the excitation field winding 22 of the exciter 20 exceeds a predetermined value to thereby initiate current flow through the associated limiting windings 150 through 160 of the magnetic amplifier 60 in the regulator system 30'. The embodiment of the invention shown in FIG. 1 is preferred since the limiting action of the limiting means 80' in the regulator system 30' on the excitation current supplied to the field winding 12 of the generator 10 and the corresponding torque applied to the shaft 31 of the generator 10 by the prime mover 24 would vary slightly with changes in the resistance of the excitation field winding 22 of the exciter 20 and with changes in the temperature of the environment in which said apparatus is applied.

It is to be understood that one or more additional magnetic amplifiers may be employed in a particular application in accordance with the teachings of the invention as disclosed. It should also be noted that the teachings of the invention may be employed in excitation systems which do not include a separate rotating exciter, such as the exciter 20 shown in FIGS. 1 and 2 of the drawings, but instead the excitation current may be supplied directly to the field winding 12 of the generator 10. It is also clear that the teachings of the invention may also be applied in similar types of excitation systems in which the excitation is obtained from means which are responsive to both the output current and to the output voltage of a dynamoelectric machine, such as a synchronous generator. For example, instead of employing a regulator system of the magnetic amplifier type as used to illustrate the invention, the excitation may be controlled by regulator systems employing electronic tubes or semiconductor devices, such as transistors, and the limiting means as disclosed may be employed to limit the excitation supplied during certain operating conditions. It is also to be understood that other types of semiconductor devices having a critical reverse breakdown voltage associated with their volt-ampere characteristics, such as double-base diodes, may be similarly employed in place of the semiconductor diode 88, as disclosed. One or more conventional diodes may also be substituted for the semiconductor diode 88 in a particular application with said diodes connected in the forward direction and the threshold voltage of said diodes serving to prevent current flow in the associated limiting windings 150 through 160 of the magnetic amplifier 60 until the limiting signal applied to said diodes exceeds a predetermined value.

The apparatus embodying the teachings of this invention has several advantages. For example, the excitation current supplied by an excitation system and its associated regulator system as disclosed is not limited or affected during normal operating conditions in the absence of short-circuit or fault conditions at the line conductors 14, 16 and 18. During certain abnormal operating conditions, however, a regulator system, including a limiting means as disclosed, limits the excitation current supplied to the associated dynamoelectric machine, as well as the torque applied to the shaft of said machine by the associated prime mover to substantially predetermined values to thereby prevent damage to the mechanical coupling between said prime mover and the shaft of said generator.

Since numerous changes may be made in the above-described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

We claim as our invention:
1. In control apparatus for a dynamoelectric machine having an excitation field winding and output terminals, the combination comprising, first means for obtaining an error signal which is a measure of the deviation of the output voltage of said machine from a predetermined value, second means connected in circuit relation with said field winding for controlling the excitation current supplied thereto in accordance with said error signal, third means for obtaining a measure of said excitation current, and fourth means connected between said third means and said second means for limiting the excitation current supplied to said field winding by said second means to substantially a predetermined value, said fourth means comprising a semiconductor device having a predetermined reverse voltage breakdown characteristic associated therewith.

2. In control apparatus for a dynamoelectric machine having an excitation field winding and output terminals, the combination comprising, first means for obtaining an error signal which is a measure of the deviation of the output voltage of said machine from a predetermined value, second means connected in circuit relation with said field winding for controlling the excitation current supplied thereto in accordance with said error signal, third means for obtaining a measure of the voltage across said field winding, and fourth means connected between said third means and said second means for limiting the excitation current supplied to said field winding by said second means when the voltage across said field winding reaches a predetermined value, said fourth means comprising a semiconductor device having a predetermined reverse voltage breakdown characteristic associated therewith.

3. In control apparatus for a dynamoelectric machine having an excitation field winding and output terminals, the combination comprising, first means for obtaining an error signal which is a measure of the deviation of the output voltage of said machine from a predetermined value, second means connected in circuit relation with said field winding for controlling the excitation current supplied thereto in accordance with said error signal, third means for obtaining a measure of said excitation current, and fourth means connected between said third means and said second means for limiting the excitation current supplied to said field winding by said second means to substantially a predetermined value, said fouth means comprising a semiconductor diode.

4. In control apparatus for a dynamoelectric machine having an excitation field winding and output terminals, the combination comprising, first means for obtaining an error signal which is a measure of the deviation of the output voltage of said machine from a predetermined value, second means connected in circuit relation with said field winding for controlling the excitation current supplied thereto in accordance with said error signal, third means for obtaining a measure of the voltage across said field winding, and fourth means connected between said third means and said second means for limiting the excitation current supplied to said field winding by said second means when the voltage across said field winding reaches a predetermined value, said fourth means comprising a semiconductor device having associated therewith a critical reverse breakdown voltage and being connected in the reverse direction.

5. In control apparatus for a dynamoelectric machine having an excitation field winding and output terminals, the combination comprising, first means for obtaining an error signal which is a measure of the deviation of the output voltage of said machine from a predetermined value, a magnetic amplifier having a control winding, a limit winding and an output connected to control the excitation current supplied to said field winding to maintain said output voltage at said predetermined value, said control winding being connected to said first means to be responsive to said error signal, second means for obtaining a measure of said excitation current, and third means connected between said second means and said limit winding for preventing said magnetic amplifier from maintaining said output voltage at said predetermined value when said excitation current exceeds a predetermined magnitude, said third means comprising a semiconductor device having a predetermined reverse voltage breakdown characteristic associated therewith.

6. In control apparatus for a dynamoelectric machine having an excitation field winding and output terminals, the combination comprising, first means for obtaining an error signal which is a measure of the deviation of the output voltage of said machine from a predetermined value, a magnetic amplifier having a control winding, a limit winding and an output connected to control the excitation current supplied to said field winding to maintain said output voltage at said predetermined value, said control winding being connected to said first means to be responsive to said error signal, second means for obtaining a measure of said excitation current, and third means connected between said second means and said limit winding for preventing said magnetic amplifier from maintaining said output voltage at said predetermined value when said excitation current exceeds a predetermined magnitude, said third means comprising a semiconductor device.

7. In control apparatus for a dynamoelectric machine having an excitation field winding and output terminals, the combination comprising, first means for obtaining an error signal which is a measure of the deviation of the output voltage of said machine from a predetermined value, a magnetic amplifier having a control winding, a limit winding and an output connected to control the excitation current supplied to said field winding to maintain said output voltage at said predetermined value, said control winding being connected to said first means to be responsive to said error signal, second means for obtaining a measure of said excitation current, and third means connected between said second means and said limit winding for preventing said magnetic amplifier from maintaining said output voltage at said predetermined value when said excitation current exceeds a predetermined magnitude, said third means comprising a semiconductor diode connected in the reverse direction.

8. In a regulator system for maintaining at substantially a predetermined value the output voltage of a dynamoelectric machine driven by a prime mover having an excitation field winding and output terminals, the combination comprising, first means for obtaining an error signal which is a measure of the deviation of the output voltage of said machine from said predetermined value, second means for controlling the excitation current supplied to said field winding in response to said error signal to maintain said output voltage at said predetermined value, the torque applied to said machine by said prime mover varying with said excitation current, and third means connected in circuit relation with said field winding and said second means to be responsive to said excitation current for limiting the excitation current supplied to said field winding by said second means and the corersponding torque applied to said machine by said prime mover to substantially predetermined values.

9. In a regulator system for maintaining at substantially a predetermined value the output voltage of a dynamoelectric machine driven by a prime mover having an excitation field winding and output terminals, the combination comprising, first means for obtaining an error signal which is a measure of the deviation of the output voltage of said machine from said predetermined value, second means for controlling the excitation current supplied to said field winding in response to said error signal to maintain said output voltage at said predetermined value, the torque applied to said machine by said prime mover varying with said excitation current, and third means connected in circuit relation with said field winding and said second means to be responsive to said excitation current for limiting the excitation current supplied to said field winding by said second means and the corresponding torque applied to said machine by said prime mover, said third means including a semiconductor diode connected in the reverse direction.

10. In control apparatus for a dynamoelectric machine having an excitation field winding and output terminals, the combination comprising, a prime mover for applying a torque to said machine, first means for supplying the excitation current to said field winding, the torque applied to said machine by said prime mover varying with said excitation current, and second means connected in circuit relation with said field winding and said first means to be responsive to said excitation current for limiting the excitation current supplied to said field winding and the corresponding torque applied to said machine by said prime mover to substantially a predetermined value.

11. In control apparatus for a dynamoelectric machine having an excitation field winding and output terminals, the combination comprising, a prime mover for applying a torque to said machine, first means for supplying the excitation current to said field winding, the torque applied to said machine by said prime mover varying with said excitation current, and second means connected in circuit relation with said field winding and said first means to be responsive to said excitation current for limiting the excitation current supplied to said field winding and the corresponding torque applied to said machine by said prime mover to substantially a predetermined value, said second means including a semiconductor diode having associated therewith a critical reverse breakdown voltage and being connected in a reverse direction.

References Cited in the file of this patent
UNITED STATES PATENTS

| | | |
|---|---|---|
| 2,728,044 | Stearley | Dec. 20, 1955 |
| 2,905,885 | Burt et al. | Sept. 22, 1959 |